US009622465B1

(12) United States Patent
Paoluccio et al.

(10) Patent No.: US 9,622,465 B1
(45) Date of Patent: Apr. 18, 2017

(54) SHORT-WAVELENGTH ULTRAVIOLET LIGHT ARRAY FOR AQUATIC INVASIVE WEED SPECIES CONTROL APPARATUS AND METHOD

(71) Applicants: John J Paoluccio, Modesto, CA (US);
John A Paoluccio, Modesto, CA (US)

(72) Inventors: John J Paoluccio, Modesto, CA (US);
John A Paoluccio, Modesto, CA (US)

(*) Notice: Subject to any disclaimer, the term of this patent is extended or adjusted under 35 U.S.C. 154(b) by 0 days.

(21) Appl. No.: 15/184,367

(22) Filed: Jun. 16, 2016

Related U.S. Application Data

(60) Provisional application No. 62/238,632, filed on Oct. 7, 2015.

(51) Int. Cl.
*A01B 41/00* (2006.01)
*A01M 21/02* (2006.01)

(52) U.S. Cl.
CPC .................... *A01M 21/02* (2013.01)

(58) Field of Classification Search
CPC .... A01M 21/00; A01M 7/0089; A01M 7/005; A01M 7/0064; A01M 19/00; A01B 41/06; A01B 79/005
See application file for complete search history.

(56) References Cited

U.S. PATENT DOCUMENTS

| | | | | |
|---|---|---|---|---|
| 3,652,844 A | * | 3/1972 | Scott, Jr. ............... | A01M 21/04 362/458 |
| 3,863,237 A | * | 1/1975 | Doerr ................... | A01K 61/003 15/1.7 |
| 4,379,217 A | * | 4/1983 | Youmans ........... | B23K 26/0081 219/121.6 |
| 4,595,838 A | | 6/1986 | Kerrschgens | |
| 4,999,982 A | * | 3/1991 | Kriger .................... | A01D 44/00 294/53.5 |
| 5,929,455 A | | 7/1999 | Jensen | |
| 6,953,528 B2 | * | 10/2005 | Nesfield ................. | E02B 3/023 210/154 |
| 8,872,136 B1 | | 10/2014 | Jackson et al. | |
| 2015/0075068 A1 | * | 3/2015 | Stowe ................... | A01M 21/04 47/1.43 |

FOREIGN PATENT DOCUMENTS

FR 2680945 A1 * 3/1993 ............. A01D 44/00

* cited by examiner

*Primary Examiner* — Monica Williams
*Assistant Examiner* — George Andonyan
(74) *Attorney, Agent, or Firm* — Robert S. Smith

(57) ABSTRACT

Apparatus for control of vegetation having at least a part within a body of water such as a lake which includes a generally planar surface and a plurality of Ultra Violet Light-C (UV-C) light sources capable of producing UV-C light at substantially a wave length of 254 nm, the sources being disposed on the generally planar surface. The method for control of vegetation includes providing a generally planar surface, providing the plurality of UV-C light sources capable of producing UV-C light at substantially a wave length of 254 nm and positioning the sources on the generally planar surface, and positioning the generally planar member with the UV-C light sources within 12 inches of vegetation to be controlled, and exposing the vegetation to be controlled to the UV-C light sources for a finite period of time.

5 Claims, 15 Drawing Sheets

SHORT-WAVELENGTH ULTRAVIOLET LIGHT ARRAY FOR AQUATIC INVASIVE WEED SPECIES CONTROL APPARATUS AND METHOD

CROSS-REFERENCE TO RELATED APPLICATIONS

This application is a continuation of U.S. provisional patent application No. 62/238,632 filed on 7 Oct. 2015 which application is incorporated by reference herein in its entirety.

TECHNICAL FIELD

The present invention is generally directed to remediation of invasive weeds disposed in lakes, ponds ocean bays and other bodies of water. More particularly, embodiments of the present invention are directed to the use of Ultra Violet Light to destroy invasive weeds and particularly to provide a practical way of using Ultra Violet Light-C (UV-C) light for controlling aquatic invasive weeds in lakes and other bodies of water. Embodiments of the present invention utilize a non-chemical treatment method to control and destroy aquatic plants.

BACKGROUND OF THE INVENTION

Eurasian Watermilfoil also known as *Myriophyllum spicatum* L. is a submersed, aquatic perennial in the Haloragaceae family that roots to the bottom of water bodies. The roots are slender and fragile. Stems emerge from root crowns, are smooth and hairless, and grow up to 21 feet to the water surface, where they branch profusely. Stems have layers of specialized, partially lignified cells that enable the stem to self-fragment without mechanical disturbance. Stem fragments are capable of forming new plants.

Eurasian watermilfoil can be found on every continent except *Antarctica*. It is native to Europe, Asia, and northern Africa. It colonizes rivers, lakes, and other water bodies. It grows under a range of trophic conditions, but it is considered an indicator of eutrophic (low levels of dissolved oxygen, high levels of organic matter) conditions. Growth and spread is limited by light, wave action, temperature and depth, preventing colonization of deep waters or water with high suspended particles. Optimum water depth for growth ranges from 3 to 13 feet, and a maximum depth for growth is 39 feet. It can tolerate moving water, and water currents and wave action facilitate fragmentation and colonization to stiller waters.

Once established in an aquatic habitat, Eurasian watermilfoil grows rapidly in spring (March-April). Stolons, lower stems, root crowns, and roots persist over the winter in California. In waters where temperatures do not drop below 50 degrees F. (10 degrees C.) there is little seasonal die-back. Root crowns store starch that fuels early takeover of the water column. During the growing season this plant undergoes auto-fragmentation, with fragments often developing roots before separation from the parent plant. Sloughing of plant parts is common after flowering.

While the present invention will be primarily described with respect to Eurasian Watermilfoil (Milfoil) it will be understood by those skilled in the art, that the invention also has applications to other invasive weed species. Aquatic invasive weeds are nonindigenous species that threaten the diversity or abundance of native species, the ecological stability of infested waters, and/or any commercial, agricultural, aquacultural, or recreational activities dependent on such waters. (As defined by the Nonindigenous Aquatic Nuisance Prevention and Control Act of 1990). Aquatic invasive weeds are introduced plants that have adapted to living in, on, or next to water, and that can grow either submerged or partially submerged in water. There are hundreds of aquatic invasive weeds that have infested U.S. waters such as the European Water Chestnut (scientific name *Trapa natans*, or *T. natans*) which is another invasive aquatic plant released inadvertently into waters of the Northeast in the late 1800s, that is slowly but inexorably spreading throughout the Northeast where it is in clogging waterways, lakes and ponds and altering aquatic habitats.

Aquatic invasive weeds, such as Eurasian Watermilfoil, have been introduced into lakes and other waterways by aquariums, remnants on boats, boat trailers and by other accidental means. They are fast growing and can easily spread rapidly and engulf an entire area. Early attempts to remove this invasive weed were by mechanical means (i.e. cutting). This proved to be unacceptable because they can easily multiply by stem fragmentation and root runners can simply grow into new infestations, exponentially complicating the problem. It has proven to be difficult to collect all the fragmented pieces and prevent/control new infestations. Listed below is a non inclusive list of aquatic invasive weeds.

Alligator weed (*Alternanthera philoxeroides*)
Brazilian Waterweed (*Egeria densa*)
*Caulerpa* Mediterranean Clone (*Caulerpa taxifolia*)
Common Reed (*Phragmites australis*)
Curly Pondweed (*Potamogeton crispus*)
Didymo (*Didymosphenia geminata*)
Eurasian Watermilfoil (*Myriophyllum spicatum*)
Giant Reed (*Arundo donax*)
Giant *Salvinia* (*Salvinia molesta*)
*Hydrilla* (*Hydrilla verticillata*)
*Melaleuca* (*Melaleuca quinquenervia*)
Purple Loosestrife (*Lythrum salicaria*)
Water Chestnut (*Trapa natans*)
Water Hyacinth (*Eichhornia crassipes*)
Water Lettuce (*Pistia stratiotes*)
Water Spinach (*Ipomoea aquatica*)

This is not a list of all invasive aquatic weeds, nor does it have any regulatory implications. The list is provided as an informational tool and for patent purposes to indicate the different varieties of aquatic invasive weeds that this array can treat. Extensive laboratory and field testing has been completed with Milfoil, Curly pondweed and Coontail weed varieties.

Numerous sources describe the importance of keeping aquatic invasive species out of lakes. However, there is little information on how to exterminate the problem without the use of herbicides or mechanical means. Extreme infestations have even less options. Below is a summary of the current control methods used by entities with aquatic invasive weeds problems:

1. Public awareness
2. Manage boats and trailers that may spread aquatic weeds from other bodies of water.
3. Mechanized cutting and pulling weeds
4. Manually cutting and pulling weeds
5. Commit to an intensive monitoring program
6. Covering with mats for long periods of time
7. Herbicides (not commonly allowed in most water bodies without special permissions and a rigorous permit process)

Frequently aquatic invasive weeds, specifically milfoil infestations occur in the shallow areas near docks and piers. These areas usually have warmer still water with more nutrient rich water that encourages weed growth. The water depth in these areas typically ranges from 8 to 15 feet.

Milfoil, is a herbaceous aquatic plant that is becoming more well known. The stems grow to the water surface and can form dense mats on the water surface. The primary means of spreading is from small rhizomes and fragmented stems. These small fragments can easily break off the delicate plants. When these fragments sink to the sediment layer they re-root and grow. This is the primary way the weeds spread and cause infestations.

PRIOR ART

These include manual pulling, mechanical cutters, chemicals and herbicides and placing mats over the problem area covering the ground surface for long periods of time. Milfoil is delicate and easily breaks off in small fragments. Any method that did not capture all the small fragments that break off from the plant causes more growth from its fragments leading to larger infestations.

The prior art includes terrestrial weed control efforts such as that disclosed in U.S. Pat. No. 8,872,136 to Jonathan A. Jackson et al issued Oct. 28, 2014 which discloses the use of UV-A and UV-B illumination of weeds. That document expressly rejects the use of UV-C light on the basis that it is extremely dangerous for humans. More particularly, the Jackson patent refers to U.S. Pat. No. 5,929,455 issued to Kaj Jensen that " . . . uses an extremely high energy, dangerous process, specifically using UV-B and UV-C which have very high and special, qualitatively different, lethality." The Jackson patent points out that discoveries were made after the bombing of Hiroshima and Nagasaki, regarding the effects on plant life from electromagnetic radiation.

The Jensen patent emphasizes the importance of heating the plant tissue to more rapidly impact the plant as well as the expense of producing large quantities of UV-C light. Inherently the control of vegetation in an aquatic environment is more difficult because of the difficulty of transmission through water and sediment. Furthermore, heating vegetation immersed in sizeable bodies of water constituting a very large heat sink is unrealistic.

PROBLEMS WITH PRIOR ART

Prior art methods to control Milfoil are costly and ineffective in addition to being labor intensive and having inherent high pollution risks. The use of any chemicals or herbicides pollutes the water and can cause long term and indirect problems that can lead to health and safety concerns of other aquatic life and water quality concerns. Some prior art methods can actually spread the milfoil infestation by breaking off thousands of small fragments that can mature into new infestations; create personnel safety problems when using divers to place, move and remove mats placed over treatment areas. Eurasian watermilfoil can be removed by mechanical harvesters. However, native vegetation tends to be removed by this method simultaneously, eliminating beneficial competitors.

Herbicide use is more highly regulated in aquatic systems than in terrestrial systems, because of the inherent dilution effects in an aquatic environment making it more difficult to use. Furthermore, current marketed herbicides hold restrictions on treated water human contact and water consumption. It is unknown at this time if residual herbicides can be removed from water treatment facilities that use these infested water bodies as their water source. All water treatment facilities are permitted to remove typical contaminants/minerals from drinking water, not necessarily herbicides. Removal would depend on the type of treatment system they currently operate and if their current permitted system is even designed to remove herbicides. Two herbicides effective on Eurasian watermilfoil are not legal for use in aquatic systems in California. Since these herbicides are non-selective, the potential disruption to and contamination of aquatic ecosystems is deemed more problematic than the damage caused by watermilfoil infestation. Herbicide approaches are also constrained because plants quickly develop resistance to herbicides and this can lead to a new herbicide resistance breeds of aquatic plants that can spread to other areas and other lakes causing untold economic damage to water related economic activity including commercial, agricultural, aquacultural, or recreational activities dependent on such waters.

From the above, it is therefore seen that there exists a need in the art to overcome the deficiencies and limitations described herein and above.

SUMMARY OF THE INVENTION

The shortcomings of the prior art are overcome and additional advantages are provided through apparatus for control of vegetation having at least a part thereof within a body of water such as a lake, pond, or river which includes a generally planar surface and a plurality of UV-C light sources capable of producing UV-C light at substantially a wave length of 254 nm, the sources being disposed on the generally planar surface.

The generally planar surface may be rigid and substantially inflexible, however, other embodiments may be a mat that is flexible enough to conform to some terrain irregularity. The UV-C light sources may be elongated and tubular and may have an axis and each the axis may be disposed in substantially perpendicular relationship to the generally planar surface. The apparatus may include a generally planar surface further including first and second planar members depending in perpendicular relationship to the generally planar surface.

The first and second planar members may each be depending in perpendicular relationship to the generally planar surface and the first planar member may be disposed in oblique relationship to the second planar member. Accordingly, the first and second planar members may define sequential spaces therebetween with respect to vegetation passing beneath the generally planar surface that are sequentially a mouth region followed by a smaller throat region whereby vegetation beneath the generally planar surface, when the generally planar surface is laterally moved, passes from a larger mouth region to a smaller throat region and the vegetation is thereby compacted to facilitate irradiation by ultraviolet light from the UV-C light sources.

In some embodiments the apparatus may include UV-C light sources that are LED devices. Other embodiments may further include attachment surfaces for cooperation with an associated hoist to facilitate lifting of the generally planar surface, followed by lateral movement and depositing the generally planar surface in a different part of a virtual grid defined on a surface to be treated.

The apparatus may include the plurality of UV-C light sources being arranged in a grid. The apparatus may further include a deflector disposed on at least one side of the generally planar surface to deflect and compact vegetation upon lateral motion of the generally planar surface. The deflector may have a generally arcuate cross section. Other embodiments may include at least one support pad carried by a guide post depending from the generally planar surface. The apparatus may further include a light shield extending along peripheral parts of the generally planar surface to avoid escape of UV light.

Other embodiments may include a deflector disposed on at least one side of the generally planar surface to deflect and compact vegetation upon lateral motion of the generally planar surface. The deflector may have a generally arcuate shape. Other embodiments may include first and second support pads carried by respective first and second guide posts depending from sides of the general planar surface. The apparatus may further including ultrasonic cleaning devices to dislodge sediment from the vegetation to be controlled. The apparatus may further include fish deterrents such as strobe lights and/or noise makers in the vicinity of the generally planar member.

Other embodiments may further include a video camera to facilitate guiding the generally planar member with respect to vegetation below the generally planar member.

Some embodiments of the apparatus may further include at one flotation bladder or first and second spaced flotation bladders cooperating with the generally planar member.

Other embodiments may include a generally planar surface that is flexible enough to bend and generally conform to the ground surface below the water in the body of water. The apparatus may have the generally planar surface manufactured of rubber.

The present invention also includes the method for control of vegetation growing with at least a part thereof within a body of water such as a lake, pond, or river which includes providing a generally planar surface, providing a plurality of UV-C light sources capable of producing UV-C light at substantially a wave length of 254 nm, positioning the sources on the generally planar surface, and positioning the generally planar member with the UV-C light sources 12 inches of vegetation to be controlled, and exposing the vegetation to be controlled to the UV-C light sources for a finite period of time. Often the period time is at least five minutes. With close proximity to the plant (within, for example, 2 inches), between the light source and plant, the exposure time may be less than 1 minute and in more practical applications where the distance is 4 to 6 inches an exposure time may be 5 minutes or more. The exposure time also depends on other factors such as water quality or clarity, type and age of the aquatic plant, sediment on surface of plant and UV light lens and other factors. The use of 5 minutes in this application is meant as a guide and exposure times longer or shorter may be necessary depending on the density of vegetation to be controlled. In our laboratory testing exposing the vegetation to be controlled to the UV-C light sources for a finite period of time of at least five minutes worked well as a duration, regardless of plant density—it produced significant visible results. The exposure proximity and duration is dependent on plant density, water quality/clarity, type and age of aquatic plant, sediment on surface of plant. As UV-C light design and efficiency improves, the treatment time duration may decrease with improved higher intensity light fixtures.

The method may include the step of providing a plurality of UV-C light sources including providing UV-C light sources that are elongated and tubular. Other embodiments include a step of providing a plurality of UV-C light sources including providing UV-C light sources that have an axis and disposing each axis in substantially perpendicular relationship to the generally planar surface.

The step of providing a generally planar surface may include providing a generally planar surface that includes first and second members having respective portions depending in perpendicular relationship to the generally planar surface. The method may include the step of providing a generally planar surface that includes providing first and second planar members that each depend in perpendicular relations havinghip to the generally planar surface further may include providing a first member having a planar portion in oblique relationship to the second planar member.

The method may include sequential spaces between the first and second planar members with respect to vegetation passing beneath the generally planar surface that are sequentially a mouth region followed by a smaller throat region whereby vegetation beneath the generally planar surface, when the generally planar surface is laterally moved, passes from a larger mouth region to a smaller throat region and the vegetation is thereby compacted to facilitate irradiation by ultraviolet light from the UV-C light sources.

Some embodiments of the method may include the step of providing a generally planar surface includes providing a surface that is substantially rigid and inflexible. Other embodiments include the step of providing a generally planar surface includes providing a surface that is a mat. The method may include the step of providing a plurality of UV-C light sources includes providing UV-C light sources are LED devices. The method may include the step of providing attachment surfaces for cooperation with an associated hoist to facilitate lifting of the generally planar surface, followed by lateral movement and depositing the generally planar surface in a different part of a virtual grid defined on a surface to be treated.

The method may include the step of providing a plurality of UV-C light sources that are arranged in a grid. Other embodiments may include providing a deflector disposed on at least one side of the generally planar surface to deflect and compact vegetation upon lateral motion of the generally planar surface. Some embodiments may further providing at least one support pad carried by a guide post depending from the generally planar surface as well as a light shield extending along peripheral parts of the generally planar surface to avoid escape of UV light. The method may include the step of positioning the generally planar member that further includes sequential movement the generally planar in a helical path. Still other embodiments include the step of positioning the generally planar member further include sequential movement into sequential positions the generally planar member within an area to be treated.

The method may include the step of positioning the generally planar member that also includes sequential movement into unique positions within a grid in an area to be treated. Other embodiments may include wherein the step of positioning the generally planar member further includes sequential movement into sequential positions and each movement involves elevating the substantially planar member above the surface of the body of water, laterally moving the substantially planar member, and lowering the substantially planar member below the surface of the body of water. The method may include the step of positioning the generally planar member further includes slowly moving the substantially planar member in substantially continuous movement. This may be achieved by towing the generally planar member over an area to be treated.

The method may include dislodging sediment from the vegetation prior to UV-C treatment using techniques selected from the group consisting of sonic pulses, liquid pulses, solid matter impingement, and gaseous impingement.

Accordingly, it is an object of the present invention to substantially diminish the impact of aquatic invasive weeds.

It is another object of the present invention to diminish the impact of aquatic invasive weeds in a manner that minimizes creation of plant fragments as well as treating any plant fragments.

It is yet another object of the present invention to avoid procedures that would in any way compromise environmental quality.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention. Those skilled in the art will understand that the devices and methods specifically described herein and illustrated in the accompanying drawings are non-limiting exemplary embodiments. The features illustrated or described in connection with one exemplary embodiment can be combined with the features of other embodiments. Such modifications and variations are intended to be included within the scope of the present invention.

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DESCRIPTION OF PREFERRED EMBODIMENTS

Figure 1:
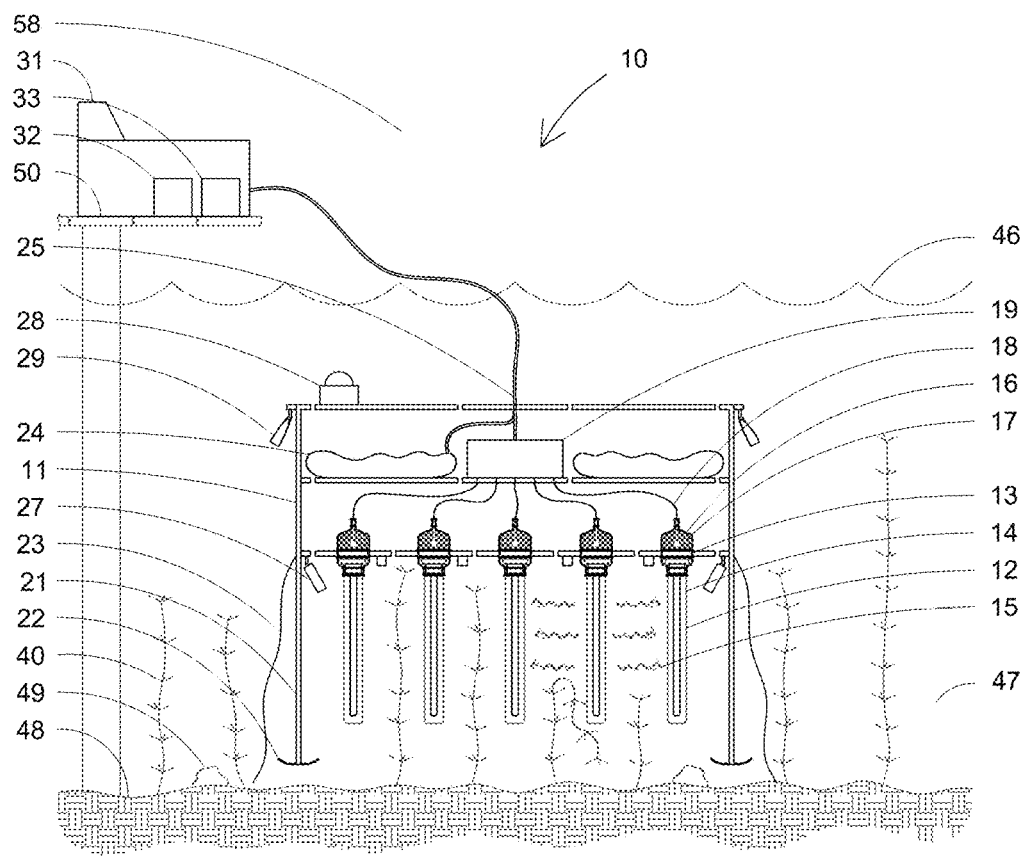
FIG. 1 is a schematic elevation view of the apparatus in accordance with one form of the present invention in use, treating milfoil plants at a marina boat slip. The support power and equipment is shown on a dock and the housing contains bladders to control buoyancy.

The UV-C apparatus in accordance with the present invention allows for elimination of harmful herbicide use, does not contaminate the air or water, safe to use, reduces fuel use and energy costs, prevents the operator from exposure to harmful chemicals, has no adverse environmental effects, leaves no residual chemicals, ease of use, effectiveness and saves time and money. The apparatus is scalable from small to large. It can allow for using a hand held spot treatment apparatus of individual plants to a large towed apparatus that over a reasonable period of time can treat an infestation covering multiple acres.

A unique characteristic of UV light is that a specific range of its wavelengths, those between 200 and 280 nm (nanometers, billionths of a meter) are categorized as germicidal—meaning they are capable of inactivating microorganisms, such as bacteria, viruses and protozoa. This capability has allowed widespread adoption of UV light as an environmentally friendly, chemical-free, and highly effective way to disinfect and safeguard water against harmful microorganisms. More particularly, the use of UV-C light at a specific range between 200 nm to 280 nm, is generally used for disinfecting water. Test results substantiate the validity of the present invention for control of Eurasian Water Milfoil at 254 nm. When Milfoil is exposed to UV-C at 254 nm for a short period, as little as five minutes, and within one foot from the light, the plant cells are damaged, the plant withers and within a few days perishes. Thus, the method and apparatus in accordance with the present invention provides an effective weed control without chemicals or the need for manual removal.

This invention includes a number of methods of accomplishing the necessary concentrating of the plants to be treated with close proximity of plant surfaces to the UV-C light and in some cases the deforming of plants to expose the more sensitive and delicate areas including the stem and the crown to the light rays.

Variations include using pumps to cause the plants to bend over or take multiple positions for maximum exposure of all the plant surfaces to the apparatus UV-C light rays.

This apparatus is scalable. The goal is to have maximum exposure of plants to the UV-C rays and control with minimal cost. UV-C lamps can easily be added or removed to optimize control and lessen operating costs. The entire apparatus can treat by exposing milfoil in close proximity to the UV-C light rays. When these weeds are disturbed thousands of plant fragments per acre can easily be dispersed. The UV-C light wave rays are effective in damaging the entire exposed plant fragment DNA and plant cells, causing them to die without reproducing.

Many of the aquatic plants are very delicate and small pieces or fragments break off easily. This has been a major problem with mechanical mowers because they leave broken segments that will re-root and start new plants. In certain variations of the invention provisions are made to capture the plant fragments in a net for more exposure and future removal.

Where severe and dense infestations occur and mechanical mowers and harvesters are used to cut and remove the established aquatic plants the UV-C apparatus can be adapted as an add-on that treats the lower plants and the plant fragments. By removing the bulk of the cut plants from the water it prevents their decomposition and polluting of the water. The UV-C apparatus can then efficiently treat the remaining plant stems all the way to the lake bottom surface where the mechanical mower and harvester cannot reach.

General Information on UV-C Lights

UV-C wavelength range: The most lethal range of wavelengths for microorganisms is in the UV-C spectrum of 200 to 280 nanometers (nm). This range, with 264 nm being the peak germicidal wavelength, is known in the industry as the Germicidal Spectrum.

UV-C use on microorganisms: When microorganisms are exposed to the high energy associated with UV short wavelength at 254 nm the energy is absorbed by the cellular RNA and DNA. This energy absorption forms new bonds between adjacent nucleotides, creating dimers. The dimers formed in the DNA of bacteria and viruses prevent replication.

UV-C light penetrates the cell walls of the microbe, causing cellular or genetic damage. The affected microbe is neutralized or becomes unable to reproduce. Intensity and exposure time will determine how quickly a susceptible microbe is disabled by UV-C light. Ultraviolet light possesses just the right amount of energy to break organic molecular bonds. As micro-organisms pass by the UV rays that radiate from the ultraviolet lamp, this bond breakage translates into cellular or genetic damage for micro-organisms, such as germs, viruses, bacteria, fungi (like molds) resulting in the destruction of the micro-organisms.

The National Institute for Occupational Safety and Health (NIOSH) has established safe exposure levels for each type of UV. These safe exposure limits are set below the levels found to cause eye irritation because the human eye is the body part most sensitive to UV. For germicidal UV (253.7 nm) the irradiance limit is set to 0.2 micro watts/square centimeter.

UV-C light ray energy is reduced as it passes through water. Therefore, it is important that the plants being treated be in close proximity to the light wave rays from the light fixture. Test conducted show very effective destruction of plant tissue and its DNA when the distance between the UV-C lamp outer lens surface and the plant tissue is within a six inch distance. The effectiveness significantly drops off beyond 12 inches.

UV-C light rays are much more effective in clear waters such that can be found, for example, in Lake Tahoe which has a high degree of clarity and higher transmittance. The water that can be found in many lakes and ponds in warmer areas has much less clarity and more suspended sediments with lower transmittance. UV-C light rays are virtually blocked by even thin layers of sediment or dirt. This may occur on both the plant surfaces and the UV-C lamp surface. A dirty film on the outer quartz light lens can significantly reduce the lamp efficiency.

The invasive weed species control apparatus 10 in accordance with the present invention utilizes the method of controlling and destroying aquatic plants 40 in accordance with the present invention. This method includes the use of UV-C light 15 in the lethal germicidal range of 254 nm. The UV-C lamp fixtures 12 with element include protective crystal quartz 14 or a UV-C transparent polymer lens 14 over the lamp element. The lamps 12 are arranged in a grid pattern that may be 8" to 12" between the arrays of lamps (12) so the plants 40 being treated are within 4" to 6" of the lens 14 surfaces. This provides for a lethal dose of UV-C light 15 that penetrates the plant 40 cell wall, injures the plant tissue and disrupts their Deoxyribonucleic Acid (DNA). This completely destroys the plant 40 and impairs its ability to reproduce. The higher the energy intensity, the greater the kill rate.

In some embodiments of the present invention the UV-C source may, for example, be a Philips fluorescent lamp bulb 30 watt, 36", T8—Medium Bi-Pin (G13) Base, Hot Cathode also used as a germicidal Sterilamp. Other embodiments may utilize an Ushio 3000339 Germicidal lamp. Such lamps are low-pressure mercury-arc lamps that emit radiation peaking at 253.7 nm (UV-C). This output at 253.7 nm is highly effective to inactivate microorganisms such as bacteria, viruses, yeast, and mold. Ordinarily, such UV-C bulbs encased in a crystal quartz tube to make it water proof. Embodiments include underwater seals to handle the water pressure surrounding the submerged bulbs. These seals are in some cases filled with beads to keep them from collapsing. The present apparatus positions multiple UV-C lamps 12 close to the plants 40 being controlled. UV-C light 15 are partially absorbed as they pass through water 47, therefore, the light 15 should be in close proximity to the plant 40 tissue. The clearer the water 47 the more effective the UV-C light 15 will act on plants 40.

The present invention includes a means for cleaning the sediment 36, debris 36 and loose dead plant cells from the surface of the aquatic plants. UV-C light 15 is absorbed or blocked by sediment 36 and debris on the plant 40 surfaces. In some embodiments the method of cleaning includes pumped water jet streams 38, mechanical shaking, vibrating 37, pulsating, compressed air injection 39 or ultrasonic cleaning 37. The protocol may include sequentially positioning the apparatus 10 over the plant 40 area to be treated; activating the shaker or cleaning mechanism 37, 38, 39 to dislodge the disruptive dust or sediment 36; allowing the sediment 36 to fall and settle, and activating the UV-C lamps 12 for a predetermined period of time.

Embodiments of the present invention combine UV-C light intensity, short-wavelength frequency, plant cleaning time, UV-C light exposure time, deflection or concentration of plants in the treatment area, and distance between lamp and plant tissue to effectively treat and control the aquatic plants 40.

This apparatus 10 may be used alone or in conjunction with prior art technology to effectively treat aquatic plants 40. For severe milfoil or other aquatic weeds 40 infestations, that may be dense and matted, it may be necessary to mechanically harvest or mow the plants first, then collect the plants 40 and fragments 41 prior to treating with the apparatus 10. For example, the apparatus 10 may be attached to a mechanical mower/harvester 55 that has a screened fragment capture net 54. The apparatus will be fixed to the trailing end of the mower so the apparatus only needs to treat the remaining mowed plants 40 and residual plant fragments 41.

This apparatus may include a plant concentrator 26 that helps direct the long and flimsy milfoil 40 into a more concentrated and compact area to increase the efficiency of treatment. The apparatus 10 for peak treatment efficiency will be used between late spring and early summer for new plant growth when the milfoil 40 is just starting to grow and is young and tender. Periodic treatments will help prevent infestations and becoming a nuisance.

FIG. 1 illustrates a preferred embodiment of the present invention. It is a portable UV-C Treatment apparatus 10 for a boat slip. Depending vertical guide posts 21 cooperate with respective support pads 22 pads or runners that rest on the ground under the water when the apparatus is in operation. Accordingly, the distance between the light source and the weeds is controlled. The individual slip may be 10 feet wide by 20 feet long. The boat slips in marinas are generally lined up along a dock 50 where the boat operator can walk and access the stored boat. Dock 50 areas are one of the most common areas where milfoil 40 grows. The habitat conditions for milfoil growth are ideal due to shallow water, warmer water, and periodic disruption by boat propellers of the usually still water conditions at the bottom 48 sediment below the water. The milfoil can foul the underside of the boat, clog engines and cover propellers. Not all slip areas are accessible to bulky mowing and harvesting equipment 55, generally slip area clearing are the responsibility of the marina management or boat slip owner.

The sequence of deployment, use, function and operation of the apparatus 10 for this boat slip will be as follows: The apparatus 10 has a UV-C light housing 11 portion that is placed in the water and a support control 31 portion that is on the dock 50. These two portions are interconnected with electric power for controls and other support equipment, wires, cables, tubing and guidelines in an umbilical cord 25. The housing supports 11 portion may have electric power or a generator 32, an air compressor 33 and or vacuum 33 unit, controls 31, monitor 31, camera 27 control and other fish deterrent equipment 28.

With a 5 feet by 5 feet housing 11 and 25 UV-C lamps spaced in a grid pattern at 12 inches on center provides for through treatment coverage within the housing area 11. Any plants 40 under this treatment area will be within approximately 3 inches to 5 inches from the lens of the UV-C lamps 12. The UV-C lamps 12 may be 9 watts each for a total power consumption of 225 watts. If these were "ON" for 2 hours the fuel cost for the electric generator will be less than $1 cost to treat the entire boat slip. If higher energy UV-C lamps were used at 35 watts each, the total wattage will be 875 watts. In this case, the fuel cost to run the generator may be less than $2. It becomes clear that the UV-C apparatus 10 is a low cost milfoil 40 treatment method.

The operator will use the control panel 31 to lower the UV-C light housing 11 into the boat slip 58 where it will float until activated. Air bladders 24 on the housing 11 will be controlled to inflate and deflate from the control station 31. When the bladders 24 are inflated the housing will float to the surface. When the bladders 24 are deflated the housing 11 will submerge. The operator may select a grid pattern over the milfoil 40 treatment areas within the boat slip to treat the milfoil 40.

The housing 11 can then be lowered into proper position over the milfoil 40. Assuming, for example that the milfoil plants 40 are 3 feet to 6 feet in length, the housing 11 will drop to a position that may be 8 inches above the lake bottom 48. The milfoil plants 40 will then be pushed down into a more concentrated area between the lake bottom 48 and the UV-C light lamps 12. Housing supports legs 21 with pads 22 will hold the housing 11 to the desired height so the UV-C lights 12 are at the predetermined operating height. Horizontal light protection grid bars 71 under the UV-C lamps 12 will prevent damage to the lens 14 from any rocks 49 or objects that may be under the housing 11.

The housing 11 may be outfitted with ultrasonic 37 cleaning equipment or other means of causing the sediment 36 and loose debris to be dislodged from the plant 40 surfaces and settle to the bottom. This cleaning means will only operate for a short period of time and only when the UV-C lamps 12 are in the "OFF" position. In addition, the housing 11 may be furnished with optional accessory devices such as strobe lights 28 and noisemakers 28 to deter fish as the housing 11 descends in the water 47. Video cameras 27 and general lighting 29 within the housing 11 can help the operator in guiding the housing 11 in position and for viewing the milfoil plants 40.

The UV-C lights 12 will then be turned "ON" and remain "ON" for a predetermined period of treatment time exposure that is, for example, 5 to 15 minutes. Where the milfoil plants 40 are young and small the time setting may be much shorter than when the plants 40 are long and dense. Some embodiments include a plant 40 disturbing means such as a pump 65 that causes the plants to move in different positions to increase the overall exposure of the plant 40 surfaces to the UV-C light rays 15. A light shield 23 prevents UV-C light 15 from escaping outside the housing 11 because these light rays 15 can cause injury to eyes.

The entire treatment time in a typical protocol from lowering the housing 11 and performing all treatment activities will require approximately one half hour. For a boat slip measuring 10 feet by 20 feet and housing 11 that is 5 feet by 5 feet there will be eight grid sections for treatment. At one half hour for each grid section the entire boat slip will be treated in four hours. This treatment may be conducted once in late spring and again later during the summer. By providing periodic treatment the milfoil 40 will never become an infestation and never cause problems for the boat. Once the milfoil 40 was under control the treatment may only be needed once per year.

After the selected grid segment has been treated the housing 11 will be raised and repositioned to another grid location to repeat the operation. This will continue until the entire boat slip was treated.

Figure 2:
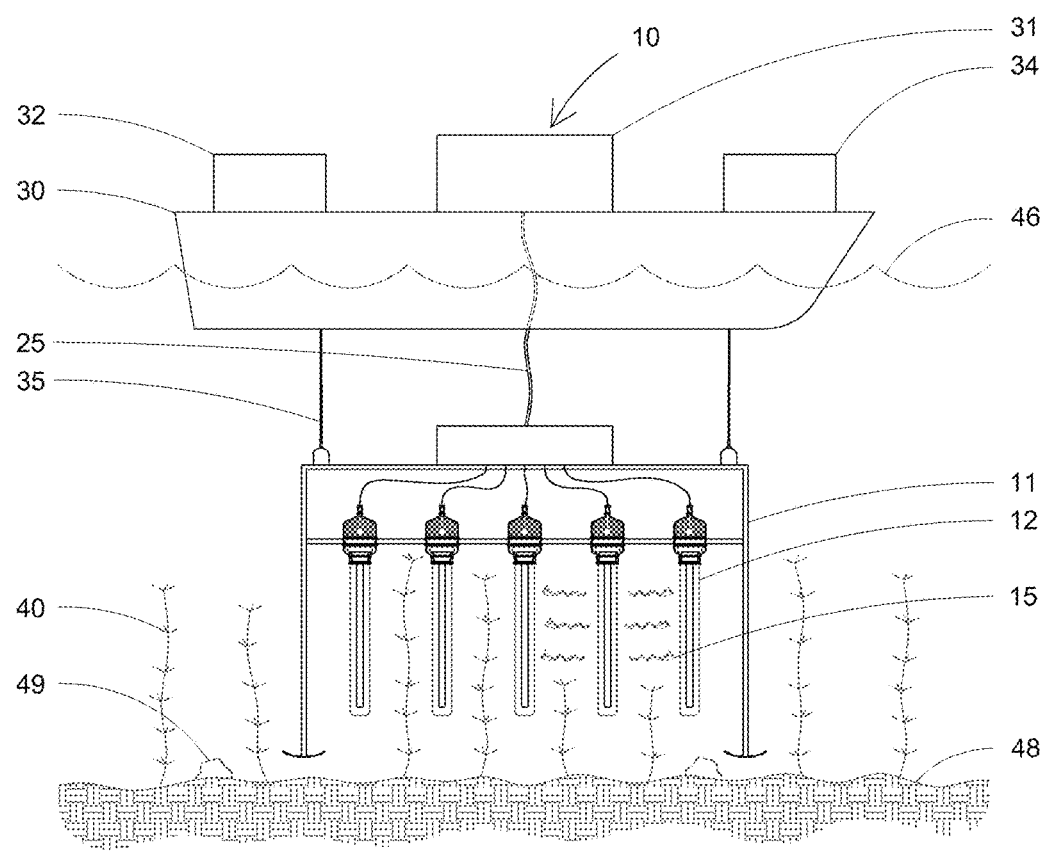
FIG. 2 is a schematic elevation view of the apparatus in accordance with one form of the present invention in a drop box housing being operated from a boat.

Referring to FIG. 2, this illustrates a boat 30 operated drop housing 11 apparatus 10 drop that will be used in open water applications such as lakes, canals and marinas. The housing 11 will be lowered over the milfoil 40 treatment area and raised and lowered until the infected area was fully treated.

Figure 3:
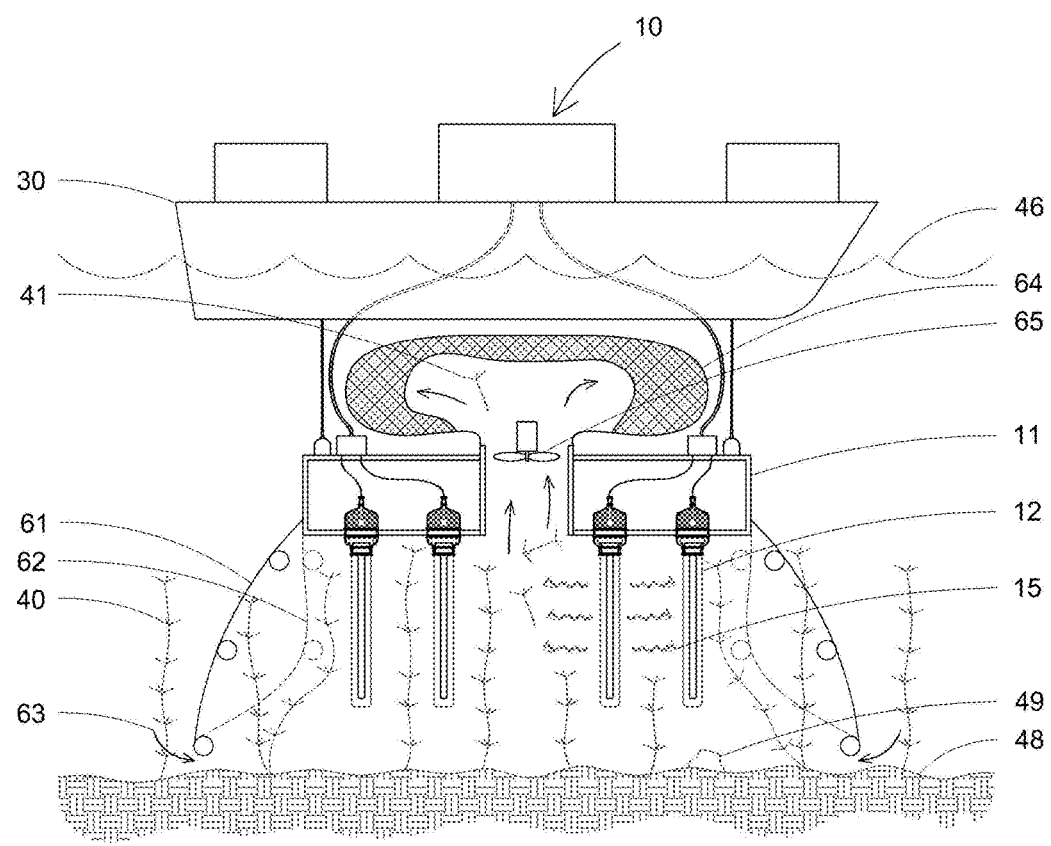
FIG. 3 is a schematic elevation view of the apparatus in accordance with one form of the present invention with a flexible enclosure and a pump to capture plant fragments in a net.

Referring to FIG. 3, this variation of the invention shows a flexible relaxed cover 61 and the deformed cover 62 during suction by the pump 65. The milfoil plants are drawn in closer to the UV-C lamps when the pump is "ON". This will cause plant fragments to flow through a net 64 area where the fragments will be collected. These plant fragments may then undergo additional treatment of the net 64 contents before being dumped for disposal.

Figure 4:
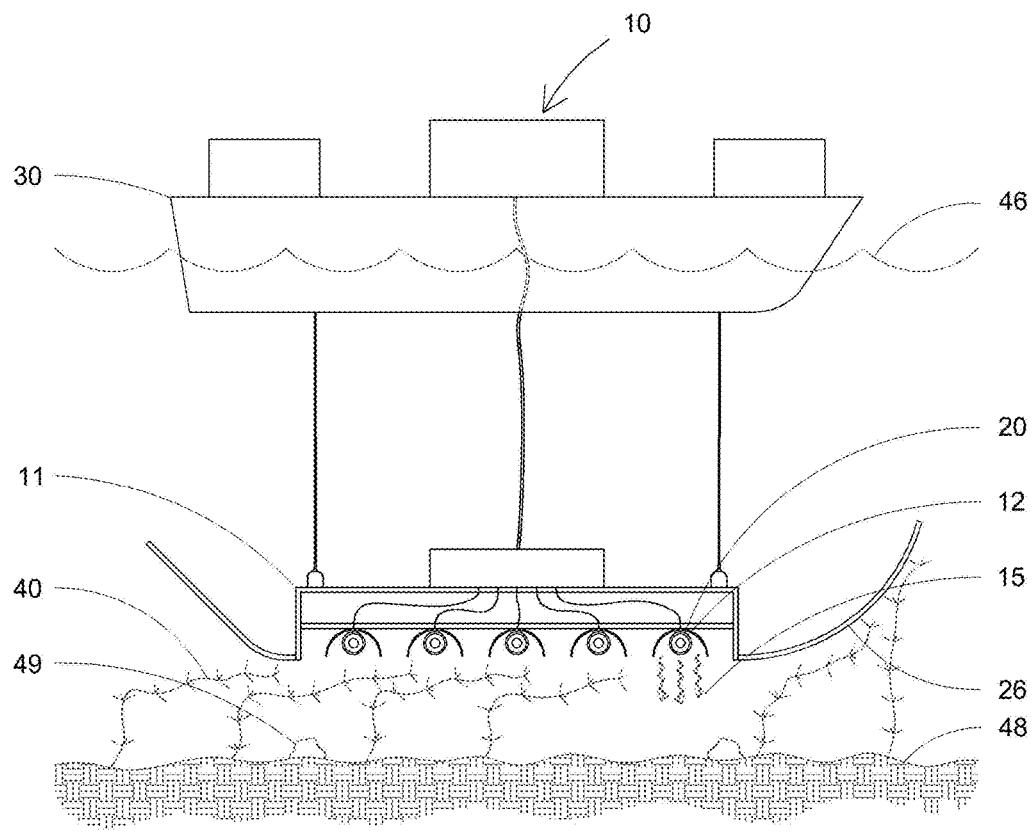
FIG. 4 is a schematic elevation view of the apparatus in accordance with one form of the present invention with curved deflector blades that act to concentrate the milfoil plants for more efficient treatment.

Referring to FIG. 4, this variation presents a towed housing apparatus by a boat. Plant deflectors and concentrators 26 will bend the long milfoil plants 40 to a fraction of their length. For example if the plants 40 were 8 feet high they may be bent to 8 inches in height as the housing 11 is towed along. That is a significant reduction in treated volume and concentrates the milfoil 40 close the UV-C lamps 12.

Figure 5:
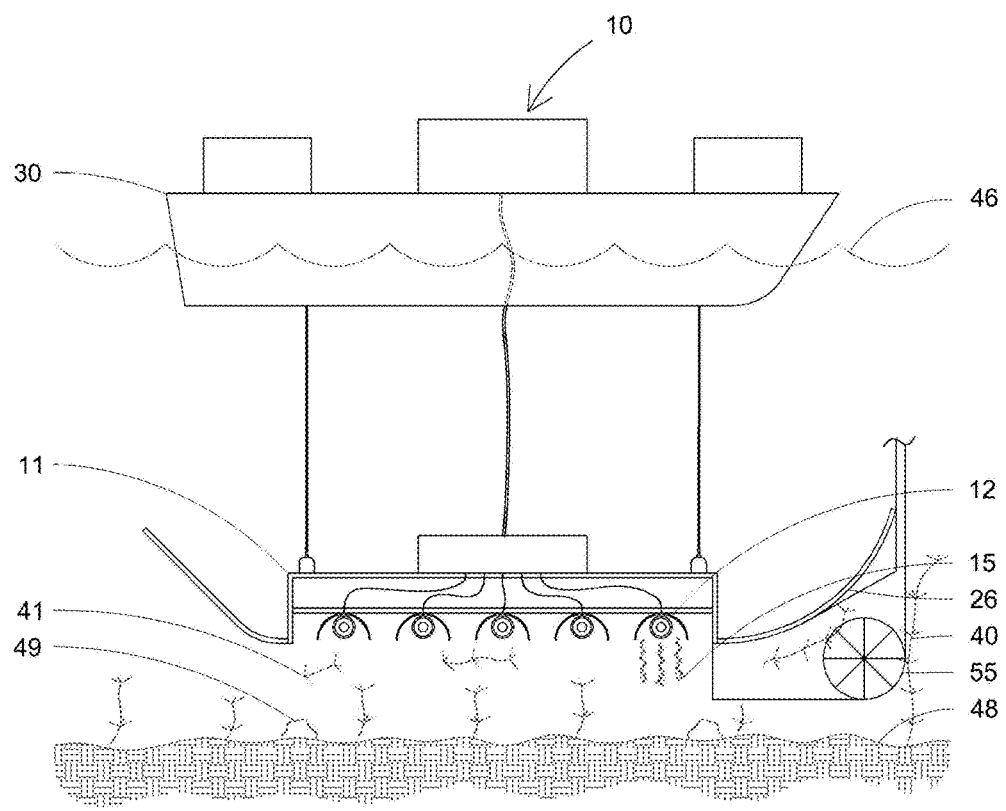
FIG. 5 is a schematic elevation view of the apparatus in accordance with one form of the present invention with curved deflector blades that act to concentrate the milfoil plants. It may be attached or trails a mechanical harvester and/or mower to treat the cut milfoil plants and fragments.

Referring to FIG. 5, this variation will be practical for heavily milfoil 40 infested and matted areas that will best be treated first with prior art mechanical 55 methods to remove the bulk of the milfoil plants 40. The towed housing 11 trails a mechanical harvester 55 or mower 55 that may have a net to capture plant fragments 41. The UV-C lamps 12 will then only treat the cut milfoil plants 40 and escaping plant fragments 41 that were not collected by the mechanical harvester 55.

Figure 6:
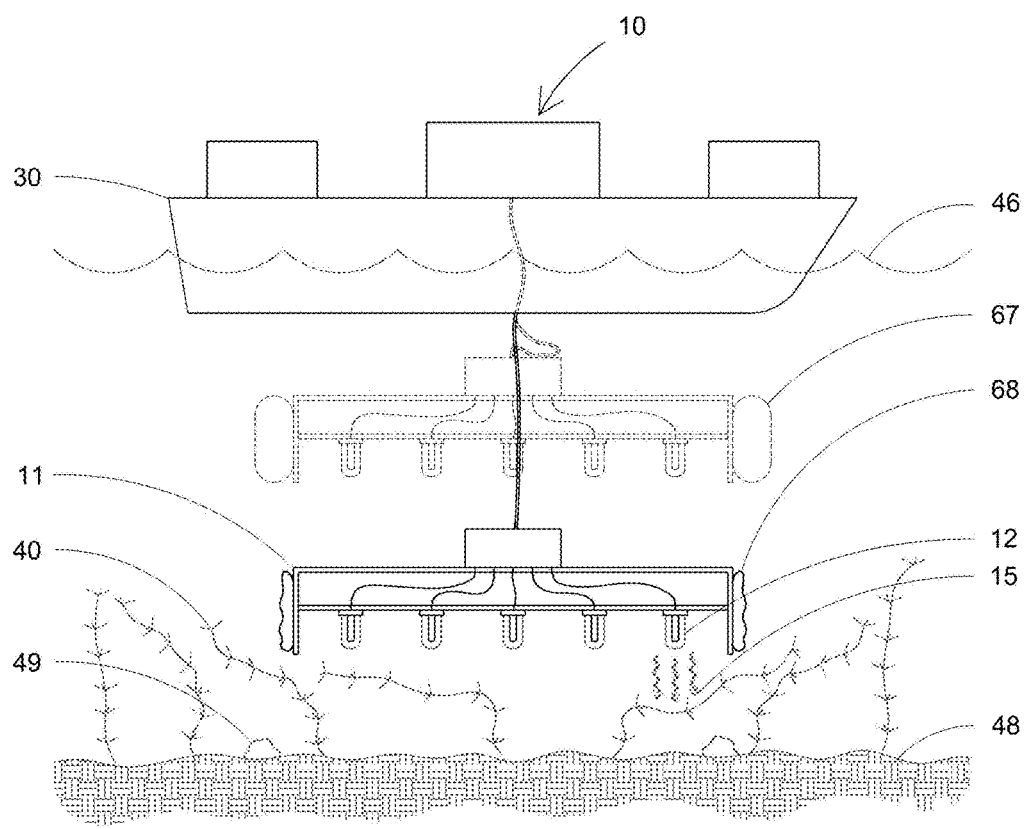
FIG. 6 is a schematic elevation view of the apparatus in accordance with one form of the present invention with a flexible mat supported with bladders to control buoyancy. It is shown supported from a boat.

Referring to FIG. 6, this variation illustrates a flexible mat housing 74 with air floatation bladders 67 to control the height of the flexible mat housing 74 relative to the surface of the water. The mat may be heavy rubber that is outfitted with air flotation bladders 67. The UV-C lights 12 in some embodiments are LED devices that are very small and very durable. Accordingly, the UV source can be placed in close proximity to the weed including treating young milfoil 40 infestations. This variation may press the milfoil plant 40 within a couple of inches from the lake bottom. The flexible mat housing 74 may even be rolled up when the air bladders 68 are deflated.

LED sources of UV-C utilized in embodiments of the present invention include, for example, the UV265R50 product manufactured by Bytech Electronics CO., Ltd.

Figure 7:
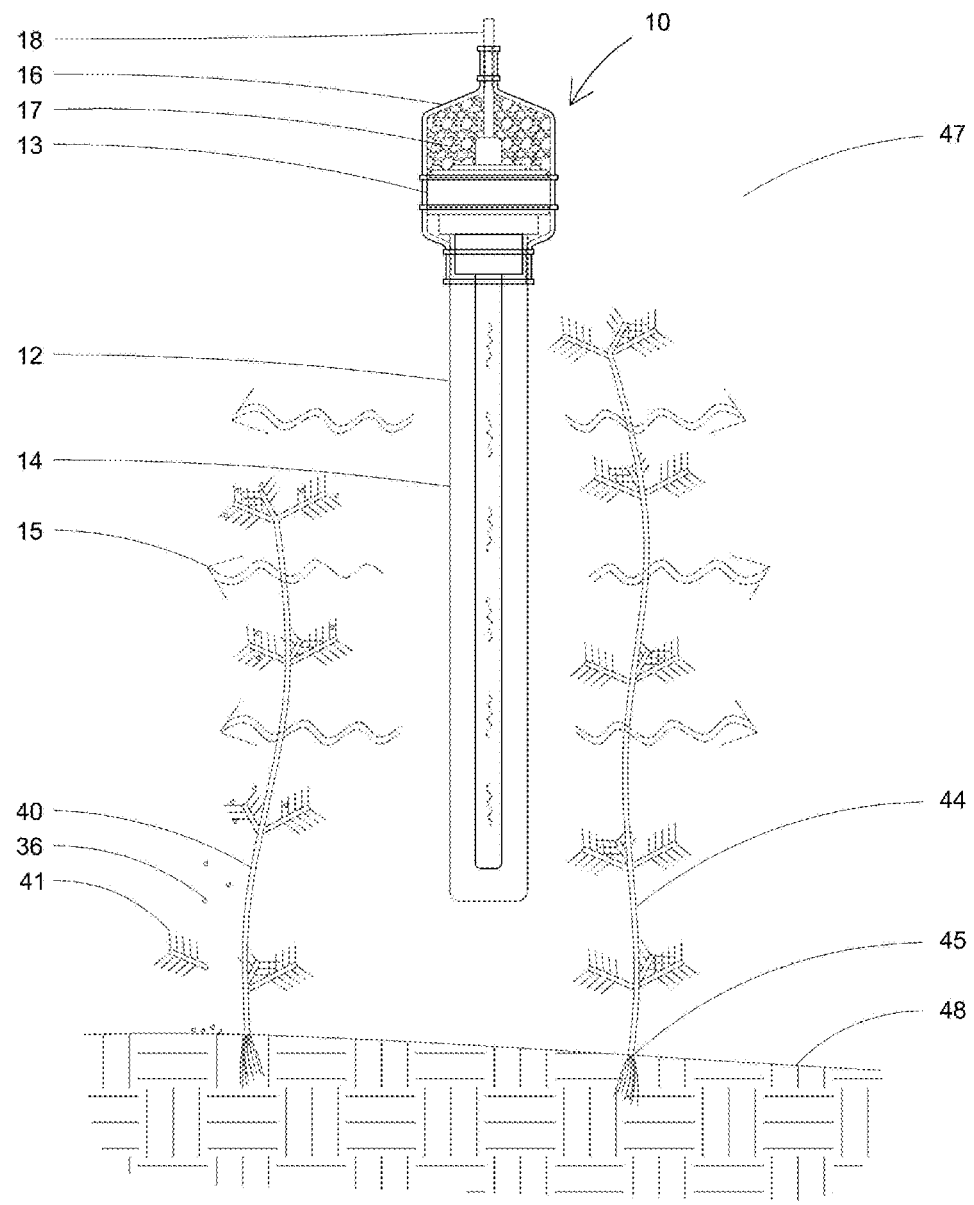
FIG. 7 is an enlarged schematic elevation view of the apparatus in accordance with one form of the present invention employing a UV-C light fixture treating milfoil. It shows sediment being cleaned off the plant surface.
Figure 8:
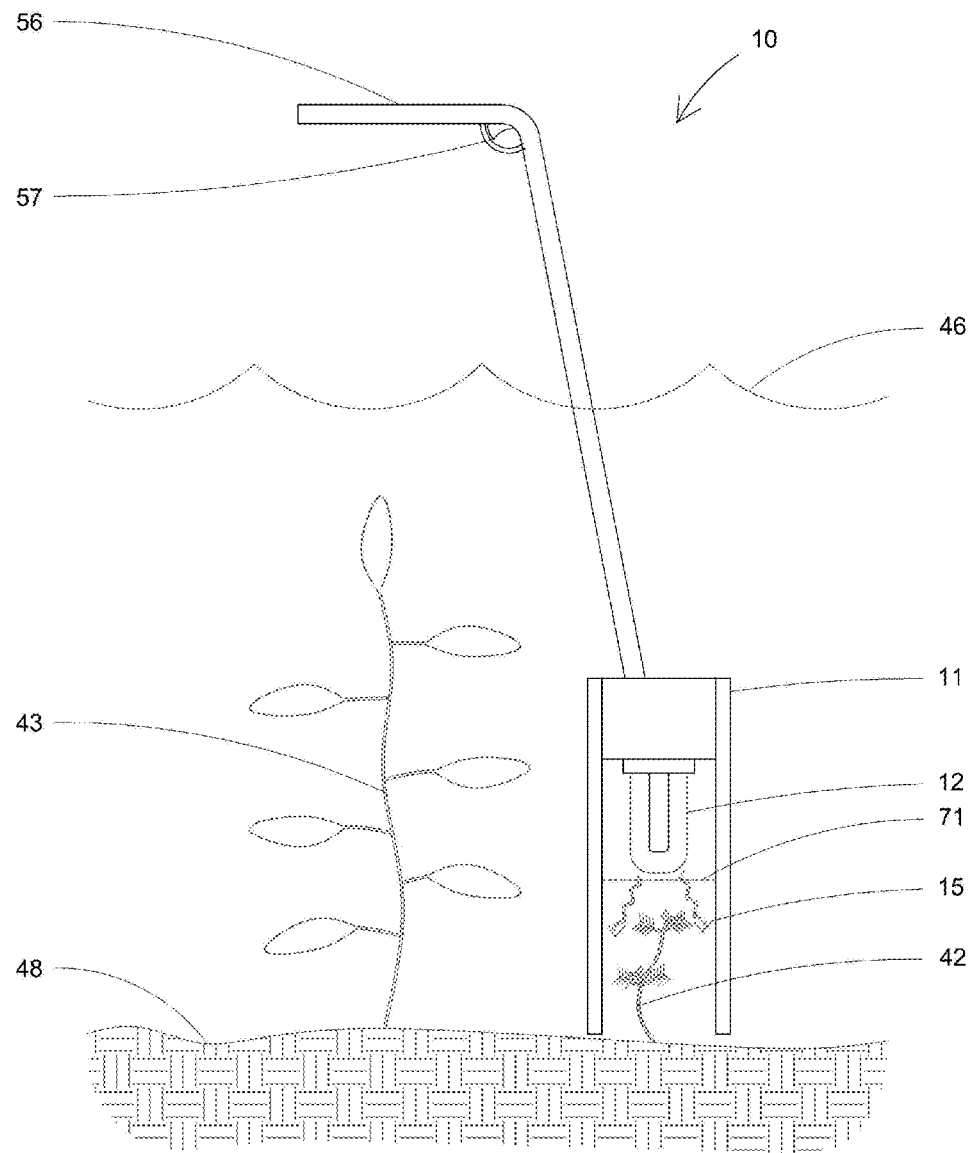
FIG. 8 is a schematic elevation view of a small hand held apparatus in accordance with one form of the present invention that can spot treat a weed with UV-C light. A nearby "desirable" plant is unaffected.

Referring to FIG. 7, this presents an enlarged view of the UV-C lamp 12 in close proximity to milfoil plants 40 and shows the sediment being cleaned from the milfoil plant 40 and plant fragment 41 surfaces. UV-C light then penetrates the cleaned milfoil plants 40 and plant fragments 41 and causes them to die.

Figure 9:
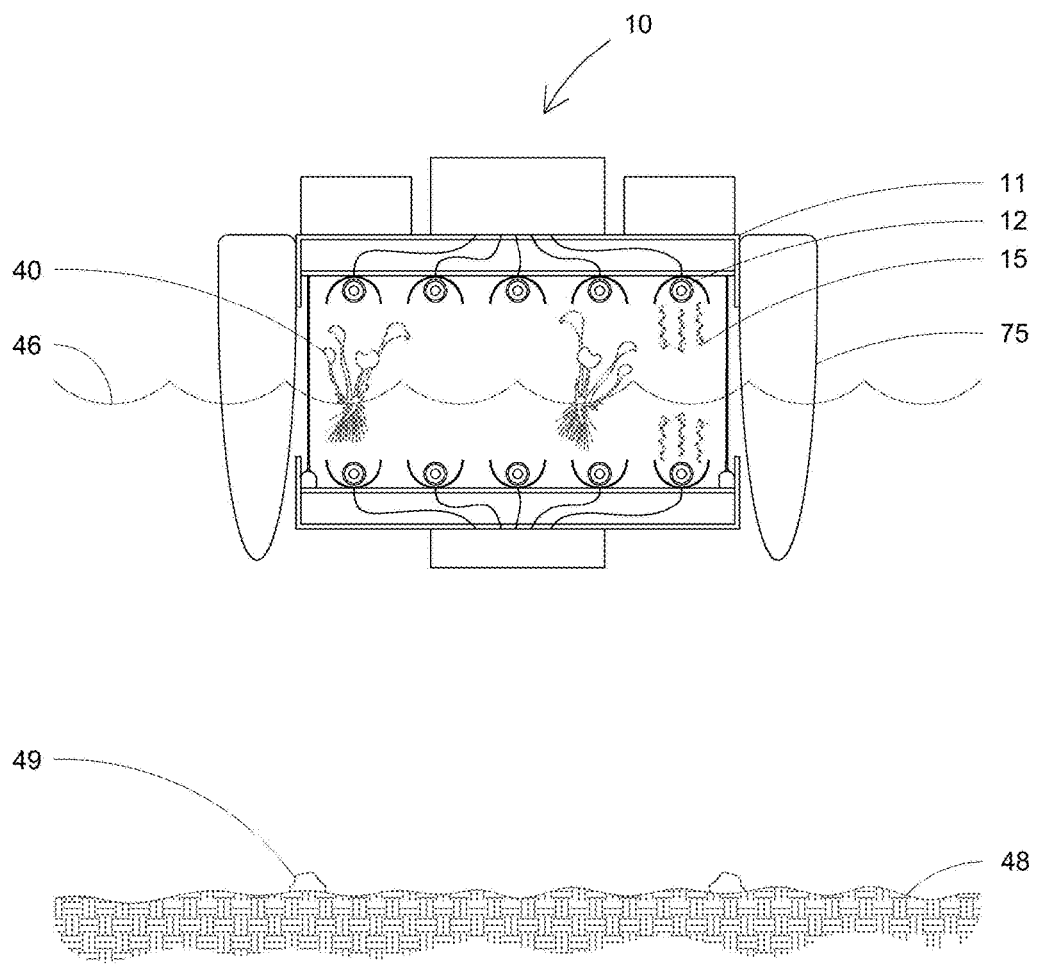
FIG. 9 is a schematic elevation view of the apparatus shown treating floating aquatic plants on the surface of the water. Pontoons hold the apparatus housing at the desired height. The UVC light fixtures may be arranged to treat above and/or below the plants.

Referring to FIG. 9, this shows a variation of the UVC apparatus 10 with application for surface growing aquatic plants 40. Pontoons 75 hold the housing 11 with control support equipment 31 above the water surface 46 and UVC light fixtures 12 above the plants 40 and or UVC light fixtures 12 directed upward below the plant 40 roots. Many species of aquatic plants 40 grow rapidly on the water surface and can prevent boating, fishing, or other water activities. Using a non-herbicide treatment method such as the UVC apparatus 10 on a regular basis could keep the water clear and free of the unwanted aquatic plants 40.

Figure 10:
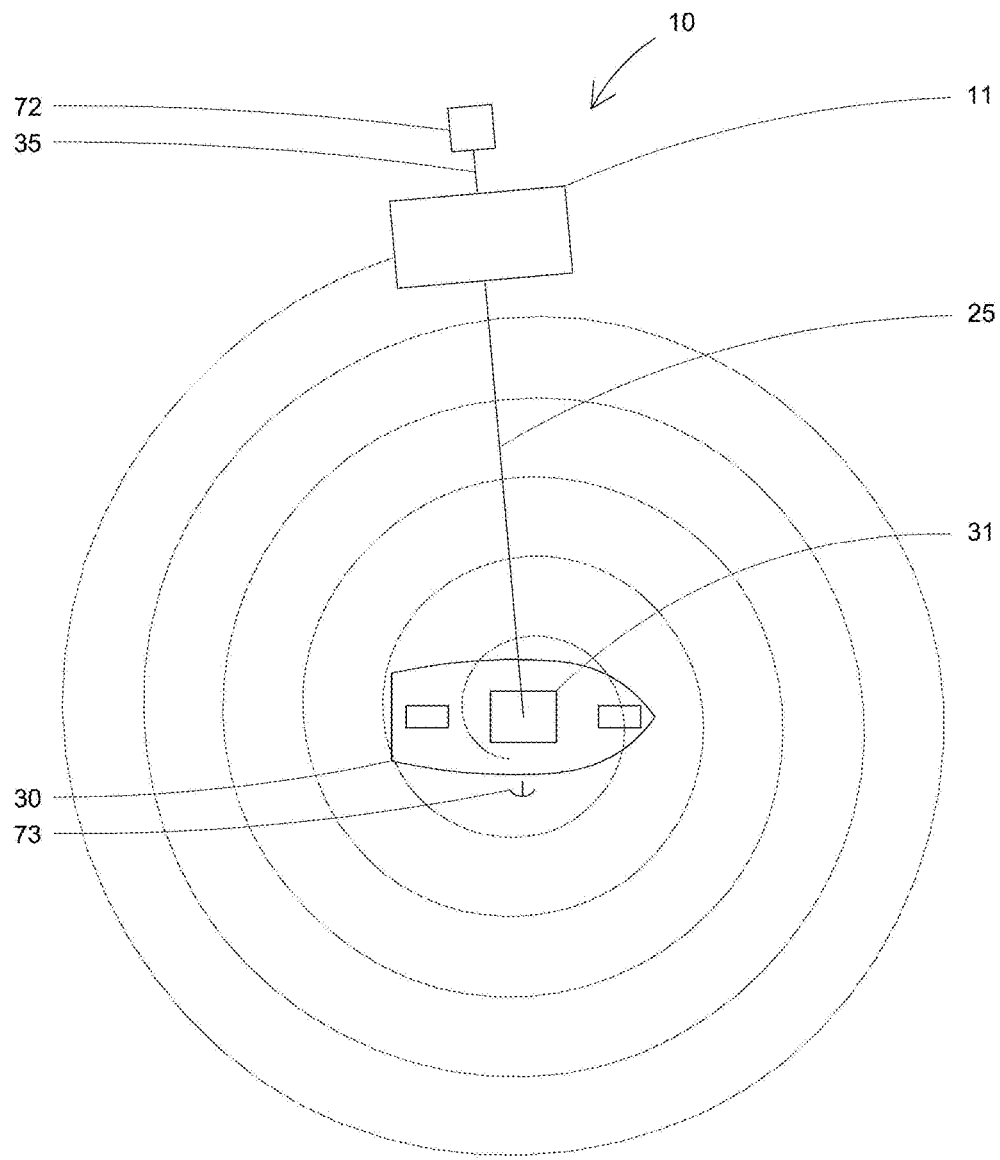
FIG. 10 is a schematic plan view of the apparatus in accordance with one form of the present invention being remotely controlled from an anchored boat and towed to treat a large area in a spiral pattern. A winch shaft reduces the treatment diameter with each circular path for complete coverage.

Referring to FIG. 10, for very large infestations, this depicts a remote trolled operated UV-C apparatus 10 where the housing 11 is being held by an umbilical cord 25 to the support equipment 31 portion that is anchored 73 to the lake bottom 48. A winch 34 on the support equipment 31 will take up a portion of the umbilical cord 25 with each rotation. This causes the housing 11 to travel in a helical path that facilitates treating a large circular area automatically.

Figure 11:
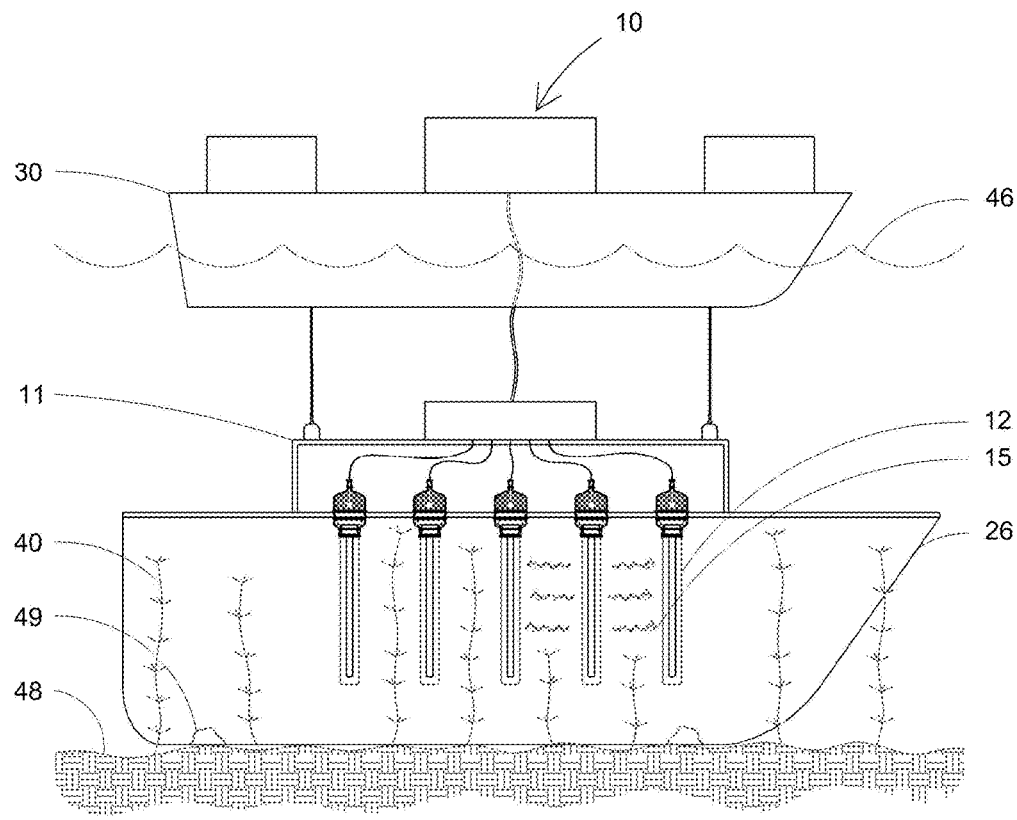
FIG. 11 is a schematic elevation view of a continuous moving apparatus in accordance with one form of the present invention with curved deflector blades that act to concentrate the milfoil plants, resulting in more efficient treatment.
Figure 12:
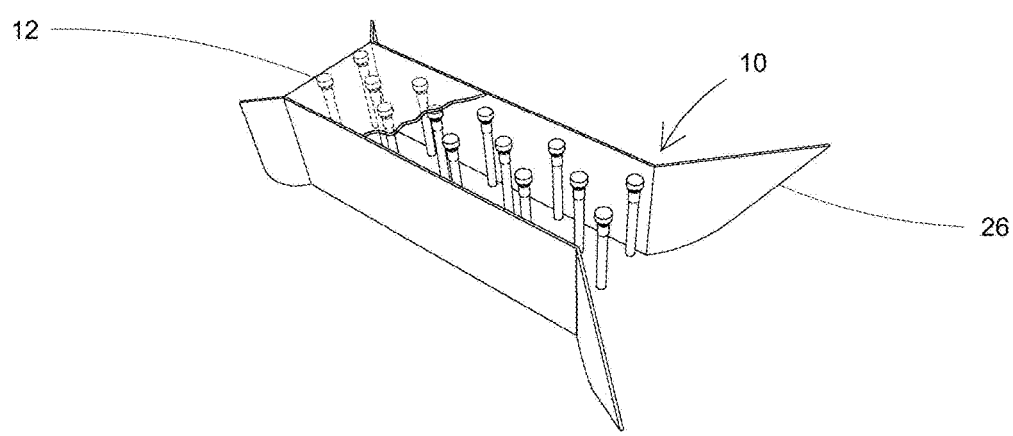
FIG. 12 is a schematic isometric view of the apparatus in accordance with one form of the present invention with curved deflector blades that act to concentrate the milfoil plants.

Referring to FIG. 11 and FIG. 12, this variation of the UV-C apparatus 10 shows the housing 11 with deflectors and concentrators 26. As the housing 11 is towed along the long milfoil plants 40 are deflected into a narrow band closer to the UV-C lights 12.

Figure 13:
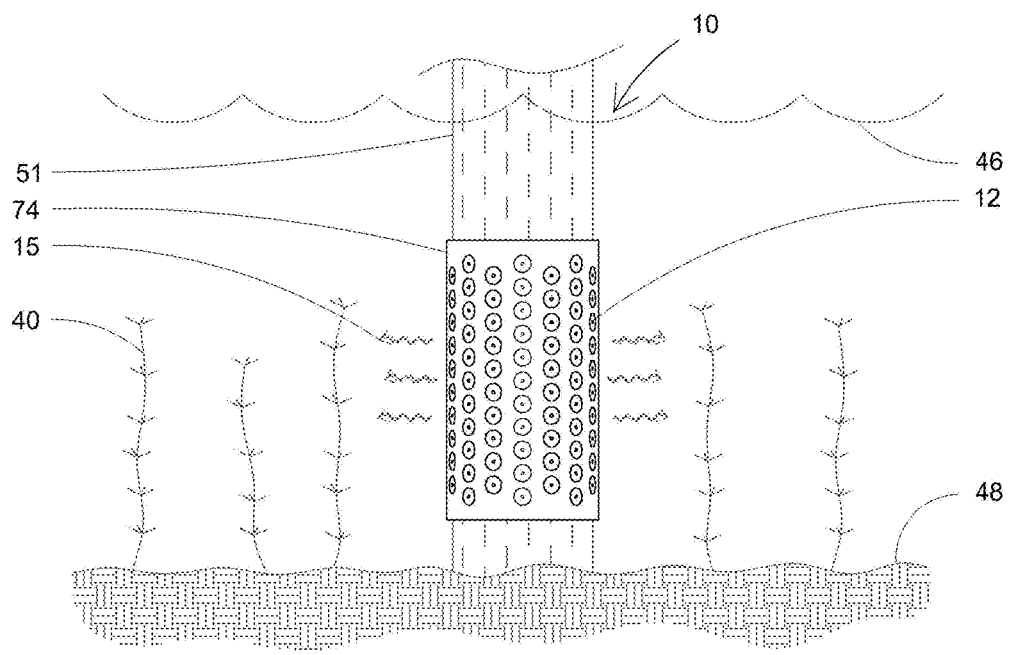
FIG. 13 is a schematic elevation view of the apparatus in accordance with one form of the present invention wrapped around a pier to treat milfoil. This version shows the use of LED UV-C light fixtures.
Figure 14:
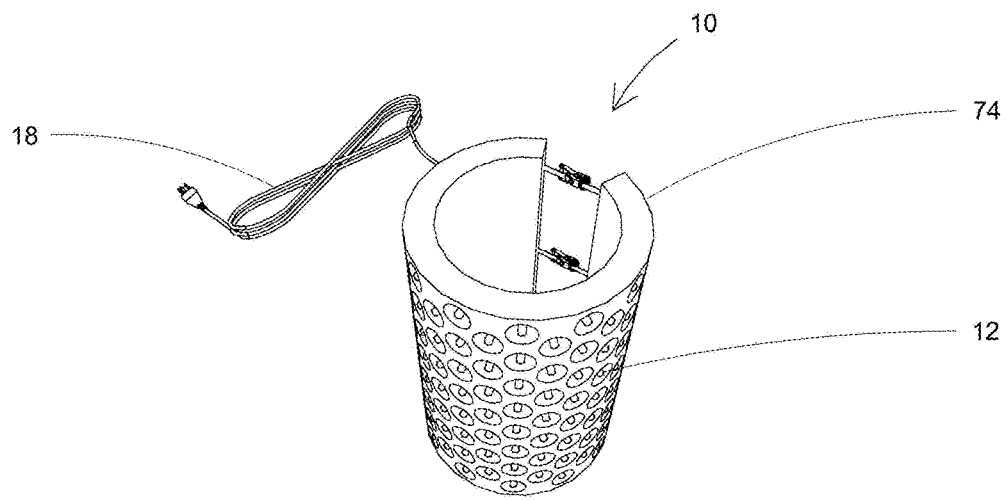
FIG. 14 is a schematic isometric view of the pier wrapping apparatus in accordance with one form of the present invention. This version shows the use of LED UV-C light fixtures.

Referring to FIG. 13 and FIG. 14, this variation of the UV-C apparatus 10 shows a flexible housing 74 that can be wrapped around a pier or dock pillar 51 to destroy any attached milfoil 40. The dock pillars 51 are ideal habitats for milfoil plants 40 and these occur where boats are docked. The flexible housing 11 that may be 4 feet in height may be mounted to the top of the pillar 51 and every 5 to 10 minutes simply lowered another 4 feet until the entire pillar 51 was treated. The UV-C lamps 12 may be of LED type and spaced very close together.

Figure 15:
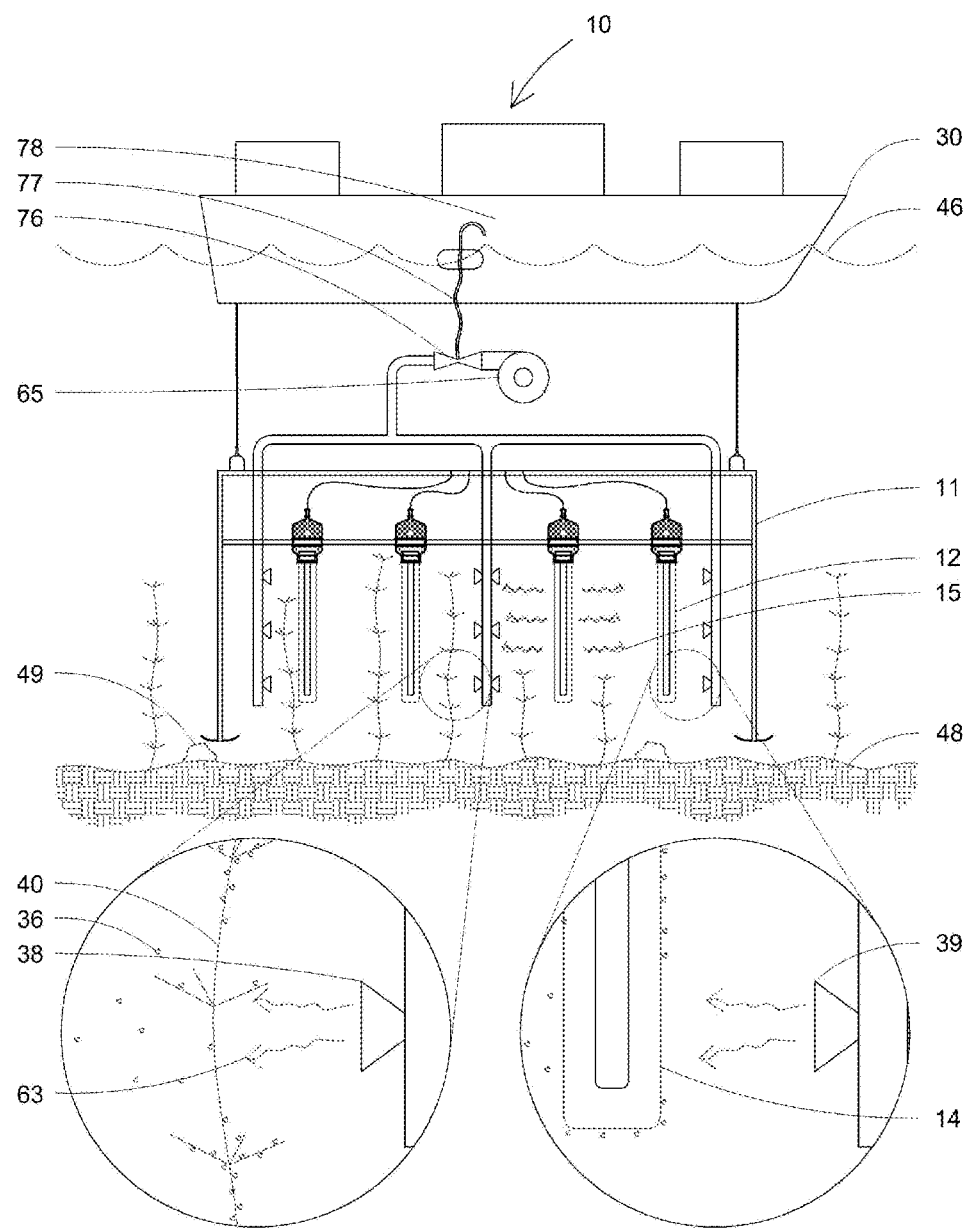
FIG. 15 is a schematic elevation view of the apparatus in accordance with one form of the present invention with pulsating pumped water jets used to clean the surface sediment and debris from the milfoil plants. It includes aspirated ambient air through a venturi. The small agitated air bubbles help clean the plant surfaces.

Referring to FIG. 15, this variation shows the apparatus 10 with a pulsating pumped water jet 38 sediment cleaning method. Ambient air 78 is drawn through a Venturi 76 on the discharge side of the pump 65 and aerated water is directed over the plants 40 to be treated. The sediment 36 is removed from the plant 40 surfaces by the pumped water cleaning method 38. Compressed air cleaning 39 can also be used to clean the plants 40 of sediment 36.

Figure 16:
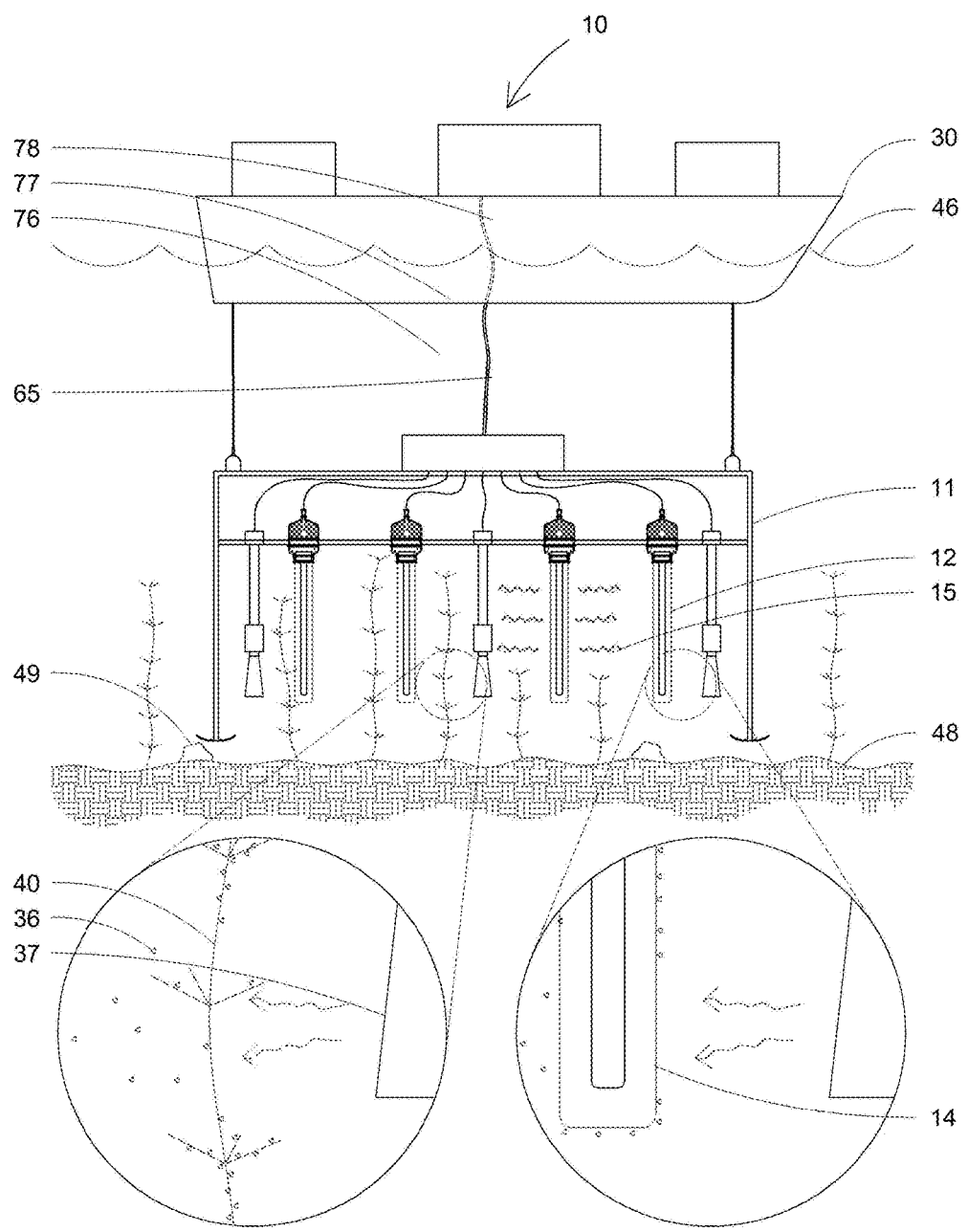
FIG. 16 is a schematic elevation view of the apparatus in accordance with one form of the present invention with ultrasonic units that help dislodge and clean the sediment and debris from the plant surfaces.

Referring to FIG. 16, this shows the apparatus 10 with a vibrating or ultrasonic cleaning 37 method to remove sediment 36 from the plant 40 and plant fragment 41 surfaces.

Figure 17:
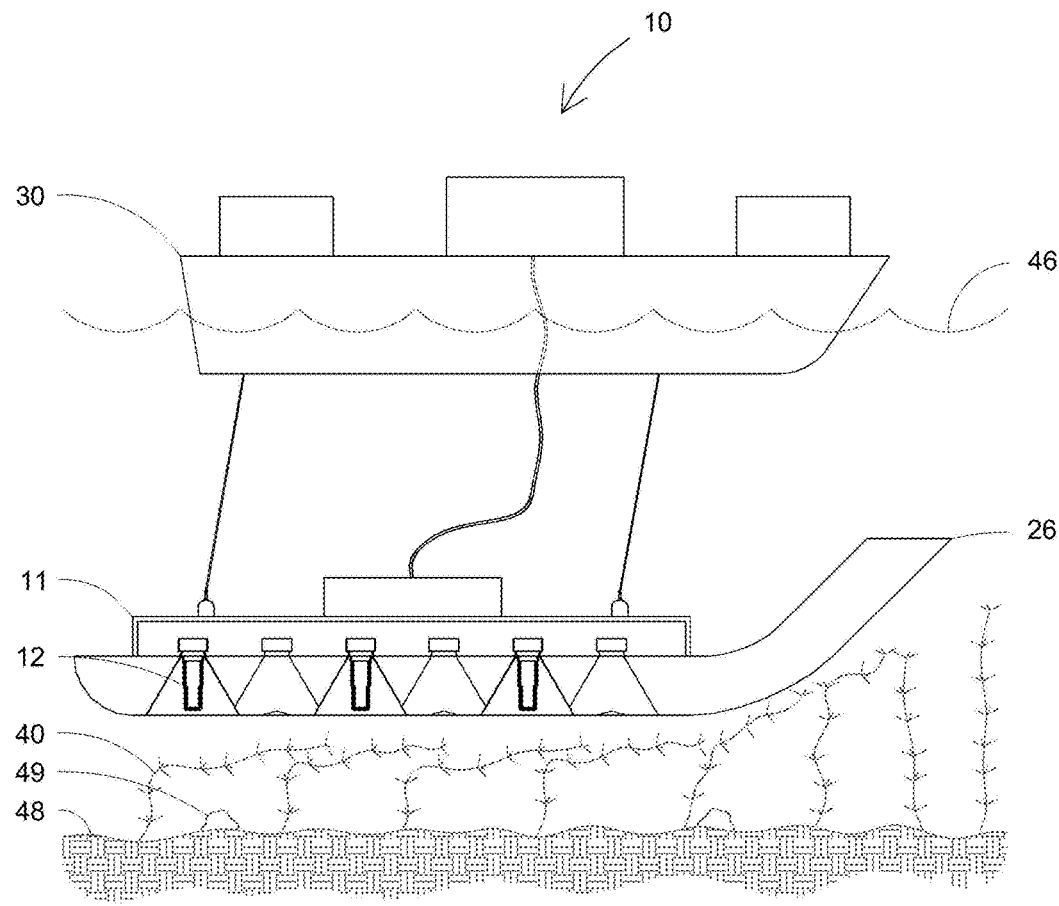
FIG. 17 is a schematic elevation view of a towed drag mat apparatus in accordance with one form of the present invention with deflecting concentrator blades. The concentrator deflects the tall milfoil to a fraction of its height and concentrates the milfoil for close and efficient treatment in close proximity to the UV-C light waves.

Referring to FIG. 17, this shows the towed apparatus 10 with a drag mat housing 11. The housing 11 may be a long flexible mat that has a deflector and concentrator to deflect the milfoil plants from their full height to less than 8 inches in height so they come in close proximity to the UV-C lamps. If the milfoil plants were 8 feet high they may be deflected and concentrated to a height of only 8 inches.

Referring to FIG. 18, this shows a variation of the UV-C apparatus 10 with application for surface growing aquatic plants 40. Pontoons 75 hold the housing 11 with control support equipment 31 above the water surface 46 and UV-C light fixtures 12 above the plants 40 and or UV-C light fixtures 12 directed upward below the plant 40 roots. Many species of aquatic plants 40 grow rapidly on the water surface and can prevent boating, fishing, or other water activities. Using a non-herbicide treatment method such as the UV-C apparatus 10 in accordance with the present invention on a regular basis will keep the water clear and free of the unwanted aquatic plants 40.

The UV-C apparatus and method of the present invention does not impact lakes and/or other connected water bodies unlike the impact when herbicides or other chemicals are utilized. In addition, with the UV-C apparatus and method of the present invention, the fear of residual small fragmented pieces of milfoil resulting in the propagation of more weeds is virtually eliminated since they are also exposed to the UV-C rays and these segments will also be damaged and not regrow. The UV-C light wave rays are effective in damaging all the exposed plant fragments, the DNA of the plant fragments (Deoxyribonucleic acid) and plant cells, causing them to die without reproducing. This is a significant improvement over all prior methods because it provides a better treatment capability. Undesirable plants may be treated with UV-C light frequencies between 200 nm and 280 nm. The present invention reduces the cost of labor, eliminates chemicals, eliminates heavy metals and/or herbicide use, provides fast and effective control, facilitates application by property owners, controls both large and small Eurasian Watermilfoil infestations and facillitates immediate set-up and use.

For aquatic plants, the key items include treating and controlling unwanted aquatic plants with UV-C light rays having a wave length of approximately of 254 nm; cleaning sediment off surface of plants with ultrasonic transducers, vibration, pulsating water jets, aspirated air in water jets, light rays within 12 inches of plant; compact plants in a concentrated area to keep plant surfaces close to UV-C light rays.

The method and apparatus for treating aquatic weeds that includes providing a series of UV-C lamps in a drop box type housing that may be lowered and raised by cables from a boat or by air bladders to control buoyancy so that it exposes the UV-C light rays in close proximity to milfoil weeds in water; and where the exposure time may be five minutes or longer; and where the distance between the UV-C light source and the milfoil plant is 12" or less; and where the UV-C tube is any desired length that may be 2' long or longer or shorter; and where the power supply may be 120 volts AC or DC power. This may be considered a batch operation as it treats a portion of a grid of invasive milfoil the size of the drop box housing each time it is moved. It may be practical when the water is 8 to 15 feet in depth.

The method of treating aquatic weeds may utilize a housing with an expanded inlet that may be 4 feet wide and tapers down to a narrow pathway that may be 1 foot wide wherein the narrow portion may be 20 feet long and furnished with a series of UV-C vertical tubes 18 inch on center; whereas the inlet causes the milfoil to deflect into a more concentrated path in order to keep the milfoil at least 12 inch maximum from the UV-C light source in order to damage the milfoil and eventually kill it. This apparatus may be towed slowly by a boat through and infected milfoil area.

The method and apparatus for treating aquatic weeds may include a large mat that may be 40 feet long by 8 feet wide and ¼ inch thick of reconstituted rubber or plastic; wherein a series of UV-C LED lights are inserted through and recessed in the mat; wherein this mat will be dragged slowly over a milfoil infested area; sensors or deflectors will keep the mat at approximately 6 inches above the bottom; and wherein the mat will be deflecting the milfoil downward so the milfoil becomes concentrated and exposed very closely to the UV-C-LED light rays. This allows for the concentrated milfoil to be exposed to the maximum UV-C LED light waves. This variation has certain advantages because it can be used on lakes with rocky bottoms and irregular surfaces. UV-C LED lamp fixtures are small in size, extremely durable, use little energy, and have a very long life.

The method of and apparatus for treating aquatic weeds may utilize a flexible dome canopy type enclosure that contains UV-C lights, a pump, and filter, to help draw milfoil plants closer to the UV-C lamps. The dome will be lowered a milfoil infestation and treat the milfoil with UV-C rays.

The method and apparatus for treating aquatic plants and plant fragments with UV-C lamps where the light rays damage the plant cells and cause the plant and plant fragments to die. This method causes no other environmental damage like herbicides that contaminate the water and cause plants to build up resistance to the herbicide chemicals.

The method and apparatus for treating aquatic plants floating on the water surface functions by treating the top and or underside of the floating plants with UV-C light rays. The UV-C lamps may be supported in an open housing and frame supported by pontoons so the UV-C light rays are at the desired distance for the top of the plants and or the underside roots of the plant.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

LISTING OF REFERENCE NUMERALS

10. Short-Wavelength Ultraviolet (UV-C) Light array for Aquatic Invasive Weed Species Control apparatus.
11. Housing apparatus: This includes the UV-C lights and other submerged items.
12. UV-C light lamp fixture: This is the complete UV-C lamp, lens and base.
13. UV-C light base: This is the power supply portion of the light fixture.

14. UV-C transparent cover. This may be a clear protective quartz lens.
15. UV-C light wave rays: These rays are in the UV-C range of 200 to 280 nm.
16. Rubber seal. This is used to waterproof certain UV-C fixtures.
17. Pressure beads or fill material within rubber seal.
18. UV-C light electric power cable.
19. Electrical box.
20. Reflective light deflector above UV-C light—optional.
21. Guide posts to keep apparatus above bottom.
22. Support pad. The expanded surface pads minimize disturbance of bottom.
23. Light shield keeps stray UV-C light rays from escaping housing.
24. Air bladders are used to control housing buoyancy and height.
25. Umbilical cord, electric wires, tubing, controls and air lines from housing.
26. Plant deflector or concentrator
27. Video camera.
28. Fish scare means with noise, strobe lights and or magnetic field
29. General lighting for viewing—not UV
30. Boat, barge or flotation unit
31. Control station with monitor and switches
32. Electric power generator
33. Air compressor/vacuum unit
34. Winch/lift equipment for controlling housing position
35. Housing tow cables
36. Sediment or dirt or loose debris on plant surface and or removed.
37. Cleaning means of sediment from plants—vibration and or ultrasonic
38. Cleaning means of sediment from plants—pulsating pumped water
39. Cleaning means of sediment from plants—pulsating compressed air
40. Aquatic plant. Milfoil and other weeds
41. Aquatic plant fragment
43. Good plant
44. Stem of plant
45. Crown of plant. Sensitive portion of plant just as it protrudes from bottom.
46. Water top surface.
47. Water.
48. Bottom of lake, marina or waterway.
49. Rock, debris or foreign object on bottom.
50. Dock or pier.
51. Pillar
54. Net to capture plant fragments.
55. Mechanical plant harvester or mower.
56. Handle.
57. Trigger for activating UV-C light.
58. Boat Slip
59. Ground surface
61. Relaxed cover
62. Cover during suction
63. Water flow
65. Pump
67. Bladder inflated
68. Bladder deflated
71. Wire mesh screen for lens guard
72. Trolling unit
73. Anchor
74. Flexible housing—Roll up mat with LED UV-C lights.
75. Pontoon
76. Venturi
77. Air Tubing
78. Ambient Air

What is claimed is:

1. A trolling apparatus, for attachment to an associated marine vehicle, which comprises:
    an elongated housing having a means for attachment to the marine vehicle such that the elongated housing is pulled through a body of water in a first direction by the marine vehicle, and further having a bow and a stern corresponding to an orientation of the housing when pulled through the body of water, said elongated housing further including a first surface;
    said elongated housing further including elongated generally parallel planar opposed sides that are generally aligned with the first direction and depend from said first surface;
    each of said generally parallel planar opposed sides having a concentrator disposed at the bow end thereof that is disposed in oblique relationship to a corresponding one of the generally parallel planar opposed sides, wherein the concentrators are configured to funnel vegetation into said elongated housing incident to trolling of the trolling apparatus in the body of water; and
    a plurality of waterproof UV-C light sources producing UV-C light at a wavelength of substantially 254 nm, said waterproof UV-C light sources being attached to said elongated housing and exposing vegetation within said trolling apparatus to UV-C light.

2. The trolling apparatus as described in claim 1 wherein said elongated housing inherently defines sequential spaces for vegetation passing beneath said first surface that are sequentially a mouth region followed by a smaller throat region whereby vegetation beneath said first surface, when said first surface is axially moved, passes from a larger mouth region to the smaller throat region and the vegetation is thereby compacted to facilitate irradiation by ultraviolet light from said UV-C light source.

3. The trolling apparatus as described in claim 1 wherein said plurality of UV-C light sources are LED devices.

4. The trolling apparatus as described in claim 1 wherein said means for attachment cooperates with an associated hoist to facilitate lifting of said first surface, followed by lateral movement and depositing said first surface in a different part of a virtual grid defined on a surface to be treated.

5. The trolling apparatus as described in claim 1 wherein said plurality of UV-C light sources are arranged in a grid.

* * * * *